US012798927B2

(12) United States Patent
Ruibal et al.

(10) Patent No.: US 12,798,927 B2
(45) Date of Patent: Nov. 17, 2026

(54) PASSENGER CONVEYING DEVICE AND METHOD FOR SAFELY OPERATING A PASSENGER CONVEYING DEVICE

(71) Applicant: TK ESCALATOR NORTE, S.A., Mieres (ES)

(72) Inventors: Elena González Ruibal, Gijón (ES); Aurelio Castaño Lantero, Cimadevilla (ES); Alberto Pello Garcia, Piedrasblancas (ES)

(73) Assignee: TK ESCALATOR NORTE, S.A., Mieres (ES)

(*) Notice: Subject to any disclaimer, the term of this patent is extended or adjusted under 35 U.S.C. 154(b) by 57 days.

(21) Appl. No.: 18/848,733

(22) PCT Filed: Jun. 27, 2023

(86) PCT No.: PCT/EP2023/067530
§ 371 (c)(1),
(2) Date: Sep. 19, 2024

(87) PCT Pub. No.: WO2024/041780
PCT Pub. Date: Feb. 29, 2024

(65) Prior Publication Data

US 2025/0197168 A1 Jun. 19, 2025

(30) Foreign Application Priority Data

Aug. 25, 2022 (EP) .................................... 22382801

(51) Int. Cl.
*B66B 29/02* (2006.01)
*B66B 21/04* (2006.01)
*B66B 29/04* (2006.01)

(52) U.S. Cl.
CPC .............. *B66B 29/02* (2013.01); *B66B 29/04* (2013.01); *B66B 21/04* (2013.01)

(58) Field of Classification Search
CPC .......... B66B 29/04; B66B 29/02; B66B 21/04
USPC .......................................................... 198/323
See application file for complete search history.

(56) References Cited

U.S. PATENT DOCUMENTS 3,913,723 A * 10/1975 Johnson .................. B66B 29/06 192/129 A
2003/0173184 A1* 9/2003 Kuruvilla ................ B66B 23/12 198/333
2004/0134748 A1* 7/2004 Tada ....................... B66B 29/06 198/323

FOREIGN PATENT DOCUMENTS

| | | | | |
|---|---|---|---|---|
| CN | 202108360 | U | 1/2012 | |
| CN | 105197760 | A | 12/2015 | |
| CN | 107324197 | A | 11/2017 | |
| DE | 3637400 | C2 | 10/1997 | |
| EP | 3275829 | A1 | 1/2018 | |
| JP | 2005255295 | A | 9/2005 | |
| WO | WO-2020207895 | A1 * | 10/2020 | B66B 29/04 |

* cited by examiner

*Primary Examiner* — James R Bidwell
(74) *Attorney, Agent, or Firm* — Dinsmore & Shohl LLP

(57) ABSTRACT

The present disclosure relates to a passenger conveying device, including a trigger device disposed continuously along a truss facing side of a skirt boarding over a length of the passenger conveying device as well as to a method for safely operating a passenger conveying device.

10 Claims, 3 Drawing Sheets

PASSENGER CONVEYING DEVICE AND METHOD FOR SAFELY OPERATING A PASSENGER CONVEYING DEVICE

CROSS REFERENCE TO RELATED APPLICATIONS

The present application is the National Phase entry of International Patent Application PCT/EP2023/067530, filed Jun. 27, 2023, which in turn claims priority benefit to European Patent Application 22382801.3, filed Aug. 25, 2022, the entire contents of both which are hereby incorporated by reference into this application.

TECHNICAL FIELD

The present disclosure relates to a passenger conveying device that includes a trigger device disposed continuously along a truss facing side of a skirt boarding over a length of the passenger conveying device. The present disclosure further relates to a method for operating a passenger conveying device in a desirable manner.

BACKGROUND

Passenger conveying devices such as escalators and moving walkways or travelators are widely applied in various public and private places such as shopping malls, airports, and the like. Safety is a crucial factor with respect to the passenger conveying devices of all kinds, as all relatively moving parts in the passenger conveying device may cause injuries to people such as pinch injuries.

In passenger conveying devices, generally there is a gap between a skirt boarding and a step belt and/or the steps which move relatively to one another. This gap is typically smaller than 4 mm, nonetheless, clothes, shoes or even body parts may get entrapped in this gap. This may cause injuries to passengers of the passenger conveying device and may also cause damages to the components of the passenger conveying device. Skirt board brushes are often used as means of a skirt boarding anti-clamping device and can effectively prevent foreign matters from entering the gap between the skirt boarding and the step belt. However such skirt board brushes cannot trigger countermeasures and the passenger conveying device may not be stopped in time to reduce the impact of objects getting trapped in said gap.

SUMMARY

Based on this background, it is an object of the present disclosure to provide an improved passenger conveying device in order to increase passenger safety and particularly enable an emergency stop of the passenger conveying device.

In order to solve the above problem, a passenger conveying device and a method for safely operating a passenger conveying device according to the independent claims are proposed. Further embodiments and/or features of the present disclosure are subject of the dependent claims and the description below.

According to one aspect of the present disclosure, a passenger conveying device is proposed, the passenger conveying device comprising a trigger device disposed continuously along a truss facing side of a skirt boarding over a length of the passenger conveying device, wherein the trigger device is configured to produce an electrical short circuit, if the skirt boarding is deformed above a predetermined threshold value.

This electrical short circuit then may actuate a control mechanism and/or circuitry, which in turn may switch off the escalator or moving walk and stop or halt any moving parts of the passenger conveying device, such as any components in the vicinity of the area where the short circuit was triggered. Hence, the proposed passenger conveying device enables full monitoring of a possible deformation of the skirt boarding, thereby increasing the safety of passengers of the passenger conveying device.

A passenger conveying device may be an escalator, moving walk or travelator and is configured to transporting people between two points in a building. Typically the passenger conveying device includes a plurality of individual stepping elements connected to one another, which move on a rail system in an endless loop between two end points or reversing stations. In the case of an escalator, an endless band of steps is formed from a plurality of steps as stepping elements, and in the case of a moving walk, an endless band of pallets is formed from a plurality of pallets as stepping elements, each of these pluralities of stepping elements forming a step belt.

In addition, the escalator or moving walk typically includes a drive, which drives the stepping elements along the rail system, and for example a handrail drive, which can drive handrails provided in the system. These drives and other components of the escalator or moving walk are installed in a building, for example, by a supporting structure respectively a truss, with the truss forming a framework for the components. In a typical construction, the rails, drives, skirt boarding etc. are individually installed in the support structure and/or welded or otherwise attached to the truss.

The trigger device may be an elongate structure disposed in contact with the inside of an escalator or moving walk skirt boarding at a location substantially opposite the steps. Therefore, if the skirt boarding is deflected or bent inwards, for example by an object caught in the space between the skirt boarding and the step, the trigger device may be shifted or deformed by the movement or the skirt boarding, thereby effecting an electrical short circuit within the trigger device.

By prescribing a predetermined threshold value, a degree to which a deformation of the skirt boarding is permissible and does not trigger a short circuit respectively a halt of the passenger conveying device may be defined. Therefore, accidental but harmless bumping into or pushing of the skirt boarding does not automatically arrest a conveying mechanism and unnecessarily inconveniences passengers and maintenance staff.

The present disclosure is among other things based on the thought, that a selective, spaced apart or punctual entrapment surveillance as it may be provided by the application of limit switches as known from the state of the art, may not suffice in order to provide an ample and consistent monitoring of possible entrapments over the length of the skirt boarding. Especially if detection or sensing points are spaced out over the length of the passenger conveying device, an entrapment situation which occurs at a distance to the sensing point may not be detected, because the impact of the deformation may not register with the sensing point.

It is therefore proposed to place a trigger device, the trigger device being capable of being activated and/or produce a trigger reaction, such as an electrical short circuit, at each point on its longitudinal extension. Hence, the trigger device may detect a possible deformation of the skirt boarding, indicating respectively signaling an object being caught or wedged in the gap between a step or pallet board and the skirt boarding.

According to one embodiment the threshold value is a value of a deformation perpendicular or essentially perpendicular to the plane of the skirt boarding. Such value of deformation may include a distance between a position of a surveilled portion of the skirt boarding under normal operating conditions and a position of said portion in a deformation process or a deformed state upon entrapment of an object. An exemplary threshold value may resemble, for example and without limitation, a threshold distance of 3 mm. In other embodiments, the threshold value may be 5 mm. In other embodiments, the threshold value may be 8 mm or greater.

If the trigger device is disposed in direct contact with the skirt boarding, the trigger device is configured to effect an electrical short circuit if it is deformed by a distortion of the skirt boarding caused by the obstruction in the gap. This for example may be realized by providing a trigger device including a stable base portion and flexible trigger portion, wherein the trigger portion is designed to deform for a predetermined distance before effecting the short circuit.

Another embodiment for realizing said trigger device may include providing a base portion and a trigger portion of the trigger device, which are spaced apart in a predetermined distance relative to each other. Hereby a fixed deformation threshold may be introduced, upon surpassing which it is necessary to halt the moving belt or stepping elements of the passenger conveying device.

According to one embodiment the trigger device is disposed in the vicinity of a trajectory of a step belt of the passenger conveying device. This trajectory particularly follows the path of the accessible surfaces of the stepping elements of the step belt. In case of a moving walk this trajectory may be located in a lower region of the skirt boarding connecting the two endpoints of the escalator, in particular a lower platform and an upper platform of the escalator. In some embodiments the trajectory may include a horizontal portion within the two platforms or areas of the platforms in order to better follow the path of the stepping elements surfaces and thereby extending the operating area of the trigger device over an accessible range of the step belt. In case of a moving walk, the trigger device may be disposed in a plane of the stepping elements, such as their surface plane, or at a certain distance above this plane, wherein this plane may be a horizontal plane or following the angle in which the moving walk is arranged in the building. In such an arrangement, the detection of an entrapment may be enhanced as the trigger device is located at least near the region where such entrapment may occur, thereby increasing detection probability.

According to one embodiment the trigger device includes a first and a second metal strip disposed over the length of the trigger device, wherein the metal strips are being arranged distanced to each other and configured to produce an electrical short circuit upon touching each other. In particular, the metal strips may be disposed parallel and at a distance of each other, resembling a threshold distance for example and without limitation, of 3 mm. In other embodiments, the threshold distance may be 4 mm. In other embodiments, the threshold distance may be 5 mm or more. If a deformation of the skirt boarding beyond the correspondingly predetermined threshold value occurs, the trigger device is deflected thereby bringing in contact the first and second metal strip, to which an electrical power is applied, causing an electrical short circuit. This electrical short circuit in turn may trigger a halt of the stepping elements in order to prevent injuries or damages to objects or the passenger conveying device itself.

According to one embodiment the first metal strip is disposed on a bumper device, the bumper device being in contact with the skirt boarding and the second metal strip is disposed on a support profile, the support profile being arranged facing away from the skirt boarding. Hereby the two metal strips are disposed facing each other, capable of contacting each other upon deformation of the skirt boarding. The bumper device may be designed as a flexible structure and the support profile may comprise a dimensionally stable structure, such that a deformation or deflection of the skirt boarding may cause the bumper device to deform in a way, that the first metal strip is pressed against the support profile and the second metal strip disposed thereon. The bumper device of the trigger device may regain its original shape upon removal of the obstruction (e.g., deformation of the skirt boarding), hence being capable of providing an operable state without a manual intervention on the trigger device being necessary.

According to one embodiment the metal strip comprises a wire and/or a metal coating. These wires or metal coating may be disposed on two facing sides of actuating elements of the trigger device (e.g. the bumper device and the support profile). The wire or metal coating may be attached to an electrical power source in order to provide an electrical current, voltage or potential for both wires. The wire or coating may provide an uncostly but resilient detection means for producing an electrical short circuit as required in the proposed trigger device.

According to one embodiment the metal strip includes a metal tape. For example, the metal tape is provided with an electrical current, voltage or potential and/or connected to or with an electrical power supply. The metal tape has a predetermined width, thereby providing for an increased surface area capable of getting in contact. Thus strain upon the trigger device including an angular offset may be reliably detected (i.e. result in contact of the two metal tapes and cause the required electrical short circuit).

According to one embodiment the trigger device is kept in contact with the skirt board by a multitude of spaced apart holding members. The trigger device may be fixed to these holding members by screwing, riveting, welding, bonding, clamping or the like, the holding members being designed or configured to fix the trigger device in the predetermined position in particular with regard to and/or against the skirt boarding. The holding members may be disposed in a distance of each other of for example and without limitation, approximately 1 m in order to ensure the trigger device and/or the bumper device is in contact with the skirt boarding or being held in a predetermined distance to the skirt boarding and hence being triggerable by deformation of the skirt boarding. In other embodiments, the holding members may be disposed in a distance of each other of for example and without limitation, approximately 1.5 m in order to ensure the trigger device and/or the bumper device is in contact with the skirt boarding or being held in a predetermined distance to the skirt boarding and hence being triggerable by deformation of the skirt boarding.

These holding members may be attached to the truss directly or by additional fixings or fastening elements for example fixing the skirt boarding. This may enable a simple and an uncostly installation while also providing a continuous contact of the trigger device with the skirt boarding. In other embodiments the trigger device may be kept in contact with the skirt boarding by a continuous holding member, extending essentially along the length of the trigger device, the skirt boarding and/or the passenger conveying device, thereby providing secure fastening and contact with the skirt boarding over the length of trigger device.

According to one embodiment the trigger device is mounted and/or supported by a skirt support device, the skirt support device attached to the truss. The skirt boarding may be attached to and/or fixed to the truss by the skirt support device, which may also form the mounting base for the trigger device. Hereby holding members as described above may be used to cover a potential distance between the skirt support device and the skirt boarding surface.

According to Another Aspect of the Present Disclosure, a Method for Safely Operating a Passenger Conveying Device Includes the Steps of a) operating the passenger conveying device,
b) upon detecting a deformation above a predetermined threshold value of the skirt boarding by an electrical short circuit of a trigger device, such as a trigger device of the kind herein described,
c) stopping the passenger conveying device.

Operating the passenger conveying device may include the operation of stepping elements or the moving belt of the passenger conveying device in order to transport passengers. Stopping the passenger conveying device may include halting or arresting the ongoing movement of stepping elements or the moving belt of the passenger conveying device. By stopping the motion of the steps and/or pallet elements of the passenger conveying device the risk of injuries to passengers and/or damages to objects and/or the passenger conveying device itself may be reduced and passenger safety increased.

Further features, advantages and possible applications of the present disclosure result from the following description in connection with the figures. In general, features of the various exemplary aspects and/or embodiments described herein may be combined with one another, unless this is clearly excluded in the context of the disclosure.

BRIEF DESCRIPTION OF THE DRAWINGS

In the following part of the description, reference is made to the figures, which are presented to illustrate specific aspects and embodiments of the present disclosure. It is understood that other aspects may be employed and structural or logical changes may be made in the illustrated embodiments without departing from the scope of the present disclosure. The following description of the figures is therefore not to be understood as limiting.

Illustrating are

DETAILED DESCRIPTION

In the following, identical reference signs refer to identical or at least similar features.

Figure 1:
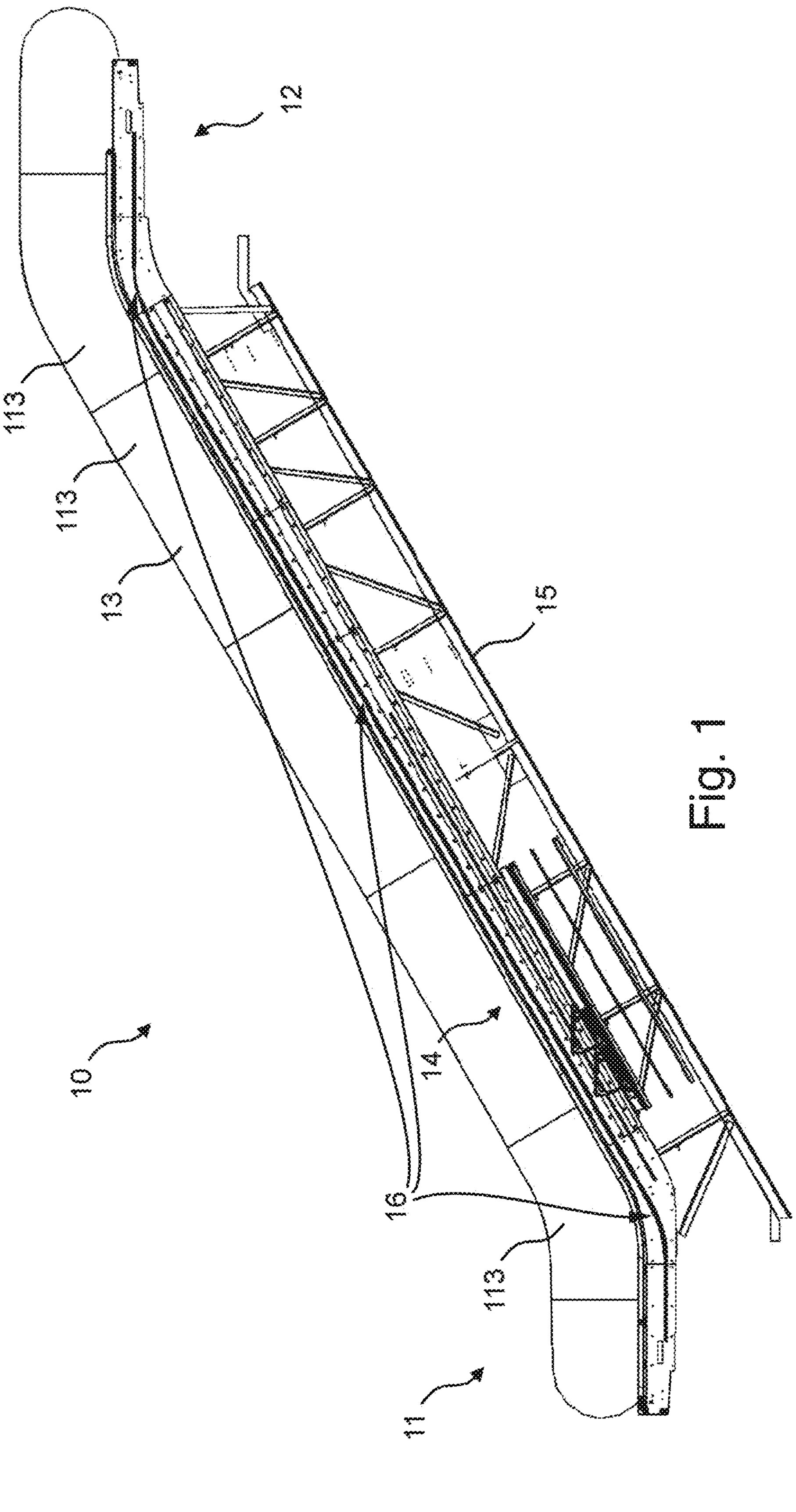
FIG. 1 a schematic representation of an exemplary passenger conveying device according to the present invention.

FIG. 1 illustrates a schematic representation of an exemplary embodiment of a passenger conveying device 10 described herein. In the depicted embodiment, the passenger conveying device 10 is implemented as an escalator 10 connecting a lower and an upper floor or access point of a building (e.g. a lower platform 11 and an upper platform 12 of the escalator 10). In other embodiments the passenger conveying device 10 may be or include a moving walk or a travelator.

A skirt boarding 13, including a plurality of skirt boarding elements 113, a step belt 14 including a plurality of connected stepping elements and other functional components are fixed on a truss 15 of the escalator 10.

A trigger device 16 is disposed continuously along the truss 15 facing side of the skirt boarding 13 and over the entire length of the passenger conveying device (e.g. the length of the step belt 14 and in the vicinity of a trajectory of the step belt 14 of the passenger conveying device 10), in order to reliably detect a deformation of the skirt boarding 13 resulting from an entrapment of an object in a gap between the skirt boarding 13 and a stepping element of the step belt 14.

The trigger device 16 is configured to produce an electrical short circuit, if or when the skirt boarding 13 is deformed above a predetermined threshold value. This threshold value may be a value of a deformation perpendicular to the plane of the skirt boarding 14, which in the illustration is vertical to the drawing plane.

Figure 2:
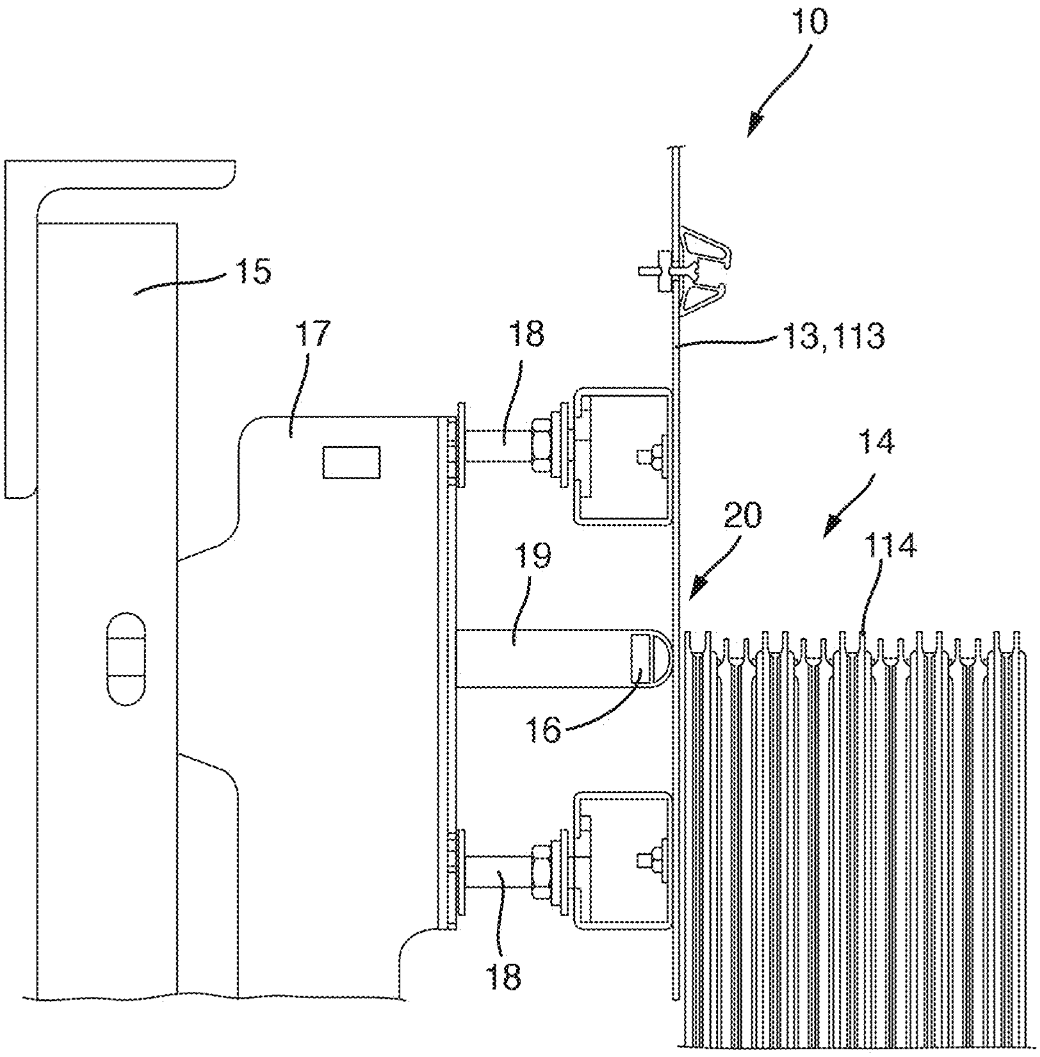
FIG. 2 a schematic representation of an exemplary mounting solution of a trigger device of an exemplary passenger conveying device according to the present invention.

FIG. 2 illustrates a schematic representation of an exemplary mounting solution of the trigger device 16 of the passenger conveying device 10 of FIG. 1 according to the present disclosure.

The skirt boarding 13 is attached to the truss 15 by a skirt support device 17 and additional fixings 18. A multitude of holding members 19 are disposed along the length of the escalator 10 in order to keep the trigger device 16 in contact with the skirt boarding 13. These holding members 19 are arranged spaced apart from each other to provide a stable contact in between the skirt support device 17 and the skirt boarding 13 and/or individual skirt boarding elements 113.

If an object gets trapped in a gap 20 between the skirt boarding 13 and the step belt 14 or step element 114, the trigger device gets displaced and/or deflected, thereby effecting an electrical short circuit. This electrical short circuit then may actuate an emergency control mechanism of the escalator 10, which may halt any moving parts of the passenger conveying device 10, such as the step belt 14 in order to prevent further damage to passengers, objects or the passenger conveying device 10 itself. Hence, the proposed passenger conveying device 10 enables monitoring of a possible deformation of the skirt boarding 13 caused by an entrapment in said gap 20, thereby increasing the safety of passengers of the passenger conveying device 10.

Figure 3:
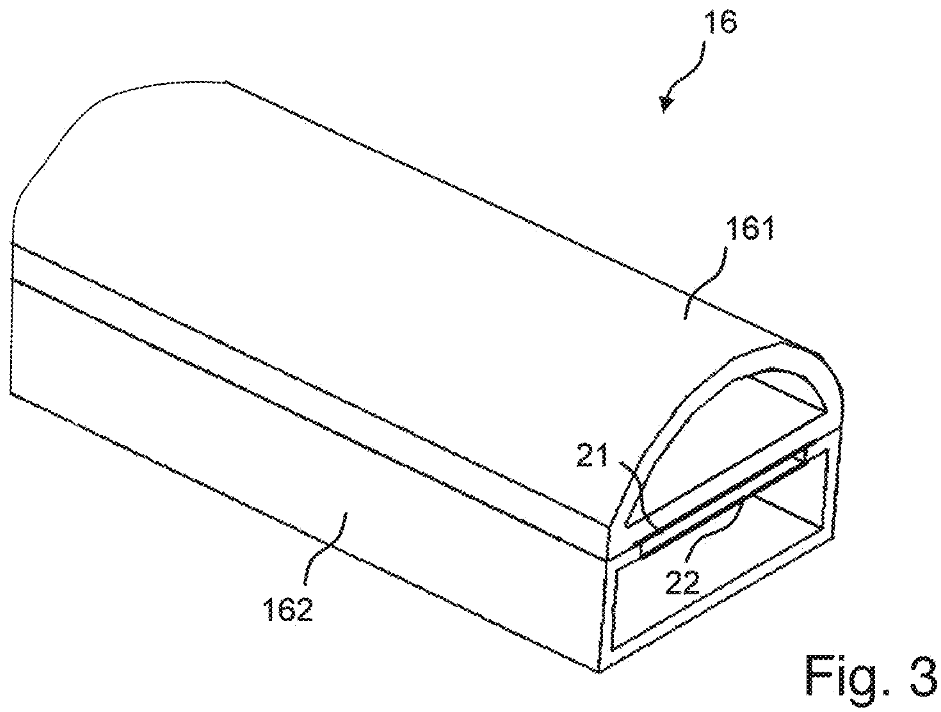
FIG. 3 a schematic representation of an exemplary trigger device of an exemplary passenger conveying device according to the present invention.

FIG. 3 illustrates a schematic representation of an exemplary embodiment of the trigger device 16 of the passenger conveying device 10 of FIG. 1 and FIG. 2 according to the present invention.

The trigger device 16 includes a flexible bumper device 161. The bumper device 161 arranged to be in contact with the skirt boarding 13 of the escalator 10 (see FIG. 2), and a support profile 162. The support profile 162 arranged facing away from the skirt boarding 13 and opposing the bumper device 161. A first metal strip 21 is disposed on the bumper device 161 and a second metal strip 22 is disposed on the support profile 162. The first and second metal strips 21, 22 extend along the trigger device 16 and are arranged to be in contact with each other upon deformation of the skirt boarding 13 above a predetermined threshold value, thereby causing an electrical short circuit. The metal strips 21, 22 of the depicted embodiment are designed as metal tape having a predetermined width, and are subjected to an electrical power supply in order to be capable of producing an electrical short circuit upon contact between the first and second metal strips 21, 22.

Figure 4:
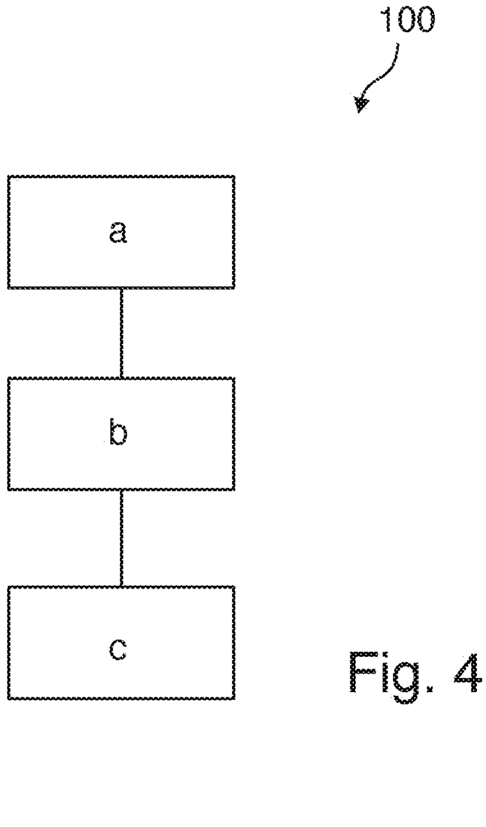
FIG. 4 a schematic representation of a method for safely operating a passenger conveying device according to the present invention.

FIG. 4 illustrates a schematic representation of a method 100 for safely operating a passenger conveying device 10 according to the present disclosure.

In a first step a), the passenger conveying device 10 is operated (e.g. a step belt 14 is moved or motioned in order to transport passengers from a first access point 11 of the passenger conveying device 10 to a second access point 12 of the passenger conveying device 10).

In a second step b), a trigger device 16 detects a deformation of the skirt boarding 13 above a predetermined threshold value by an electrical short circuit.

In a third step c), the passenger conveying device 10 is stopped (e.g. by an emergency stopping mechanism or circuit triggered by the electrical short circuit of the trigger device 16).

By stopping the motion of the steps 114 and/or step belt 14 of the passenger conveying device 10, the risk of injuries to passengers and/or damages to objects and/or the passenger conveying device 10 itself, caused by an entrapment in a gap 20 of the passenger conveying device 10, may be reduced and passenger safety may be increased.

The invention claimed is:

1. A passenger conveying device, comprising:

a trigger device disposed continuously along a truss facing side of a skirt boarding over a length of the passenger conveying device, wherein the trigger device is configured to produce an electrical short circuit, when the skirt boarding is deformed above a predetermined threshold value.

2. The passenger conveying device according to claim 1, wherein the threshold value is a value of a deformation perpendicular to the plane of the skirt boarding.

3. The passenger conveying device according to claim 1, wherein the trigger device is disposed in the vicinity of a trajectory of a step belt of the passenger conveying device.

4. The passenger conveying device according to claim 1, wherein the trigger device comprises:

a first and a second metal strip disposed over the length of the trigger device, wherein the metal strips are being arranged distanced to each other and configured to produce an electrical short circuit upon touching each other.

5. The passenger conveying device according to claim 4, wherein the first metal strip is disposed on a bumper device, the bumper device being in contact with the skirt boarding and the second metal strip is disposed on a support profile, the support profile being arranged facing away from the skirt boarding.

6. The passenger conveying device according to claim 4, wherein the metal strip comprises a wire.

7. The passenger conveying device (10) according to claim 4, wherein the metal strip comprises a metal tape.

8. The passenger conveying device according to claim 1, wherein the trigger device is kept in contact with the skirt boarding by a multitude of spaced apart holding members.

9. The passenger conveying device according to claim 1, wherein the trigger device is mounted by a skirt support device, the skirt support device being attached to the truss.

10. A method for operating a passenger conveying device comprising steps of:

operating the passenger conveying device; and upon detecting a deformation above a predetermined threshold value of the skirt boarding by an electrical short circuit of a trigger device, the trigger device being disposed continuously along a truss facing side of the skirt boarding, stopping the passenger conveying device.

* * * * *